United States Patent [19]

Waters et al.

[11] Patent Number: 4,476,552
[45] Date of Patent: Oct. 9, 1984

[54] GEOPHYSICAL PROSPECTING METHODS

[75] Inventors: Kenneth H. Waters; George W. Rice, both of Ponca City, Okla.

[73] Assignee: Conoco Inc., Ponca City, Okla.

[21] Appl. No.: 615,485

[22] Filed: Sep. 22, 1975

Related U.S. Application Data

[62] Division of Ser. No. 228,864, Feb. 24, 1972, abandoned.

[51] Int. Cl.$^3$ .................... G01V 1/16; G01V 1/20
[52] U.S. Cl. .................................. 367/56; 367/58
[58] Field of Search ............... 367/21, 56, 58, 59, 367/61

[56] References Cited

U.S. PATENT DOCUMENTS

| | | | |
|---|---|---|---|
| 3,431,999 | 3/1969 | Glazier | 367/56 |
| 3,597,727 | 3/1971 | Judson | 367/51 |
| 3,746,122 | 7/1973 | Davis | 367/56 |

*Primary Examiner*—Nelson Moskowitz
*Attorney, Agent, or Firm*—William J. Miller

[57] ABSTRACT

A method for deriving seismic information from over a relatively large expanse of land to determine relevant strike, dip, velocity and related information. The method consists of the utilization of a plurality of strike, dip, velocity (SDV) cross patterned source-receiver arrays disposed at spaced known locations over a selected terrain, thereafter to derive localized and offset seismic data relative to selected pairs or groups of the SDV cross patterns with further signal processing to smooth and integrate strike, dip and velocity information over a specific substratum. The method utilizes information as derived from each SDV cross pattern, as well as offset seismic signal information derived from source/receiver combinations spanning two selected SDV cross patterns.

4 Claims, 12 Drawing Figures

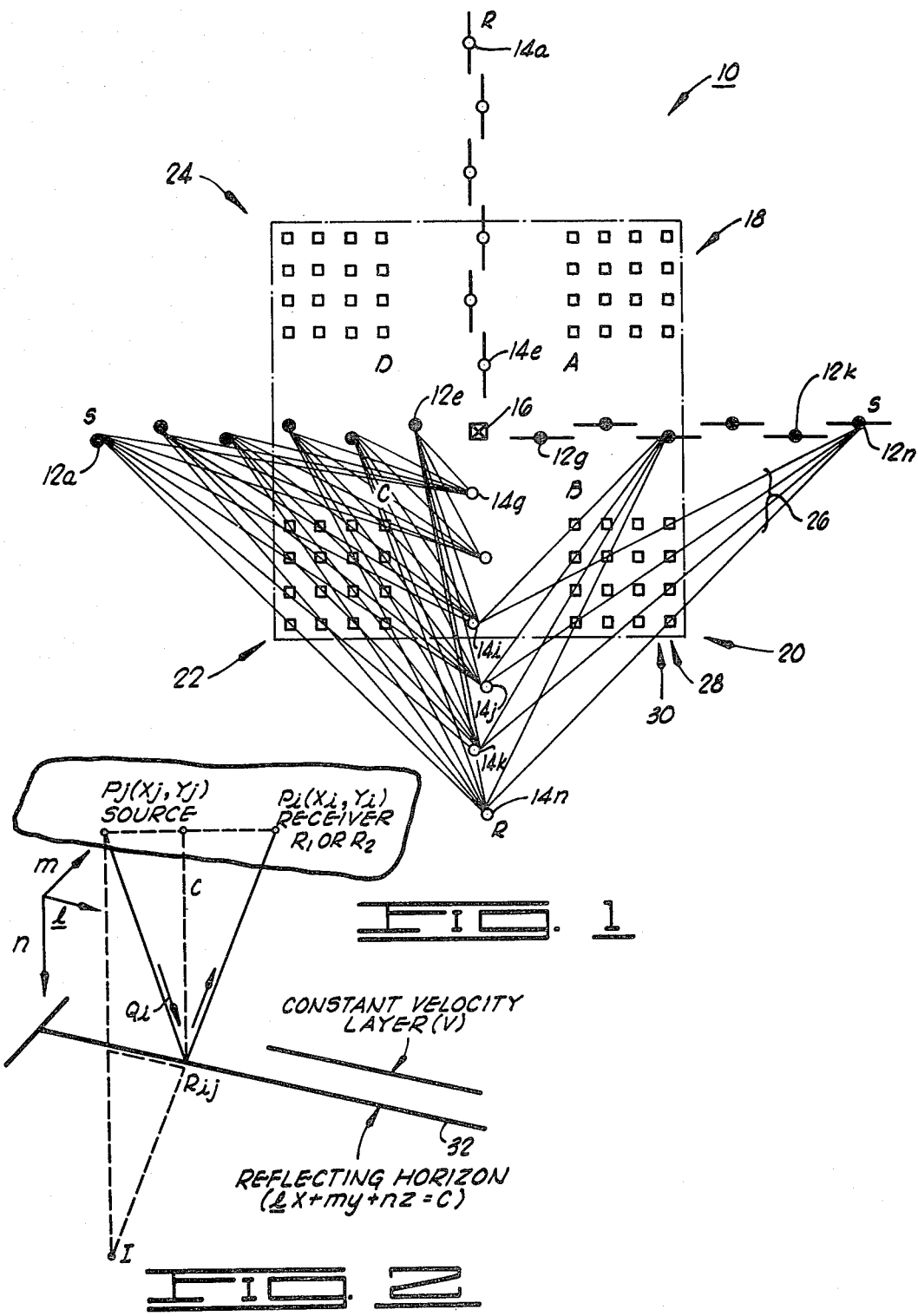

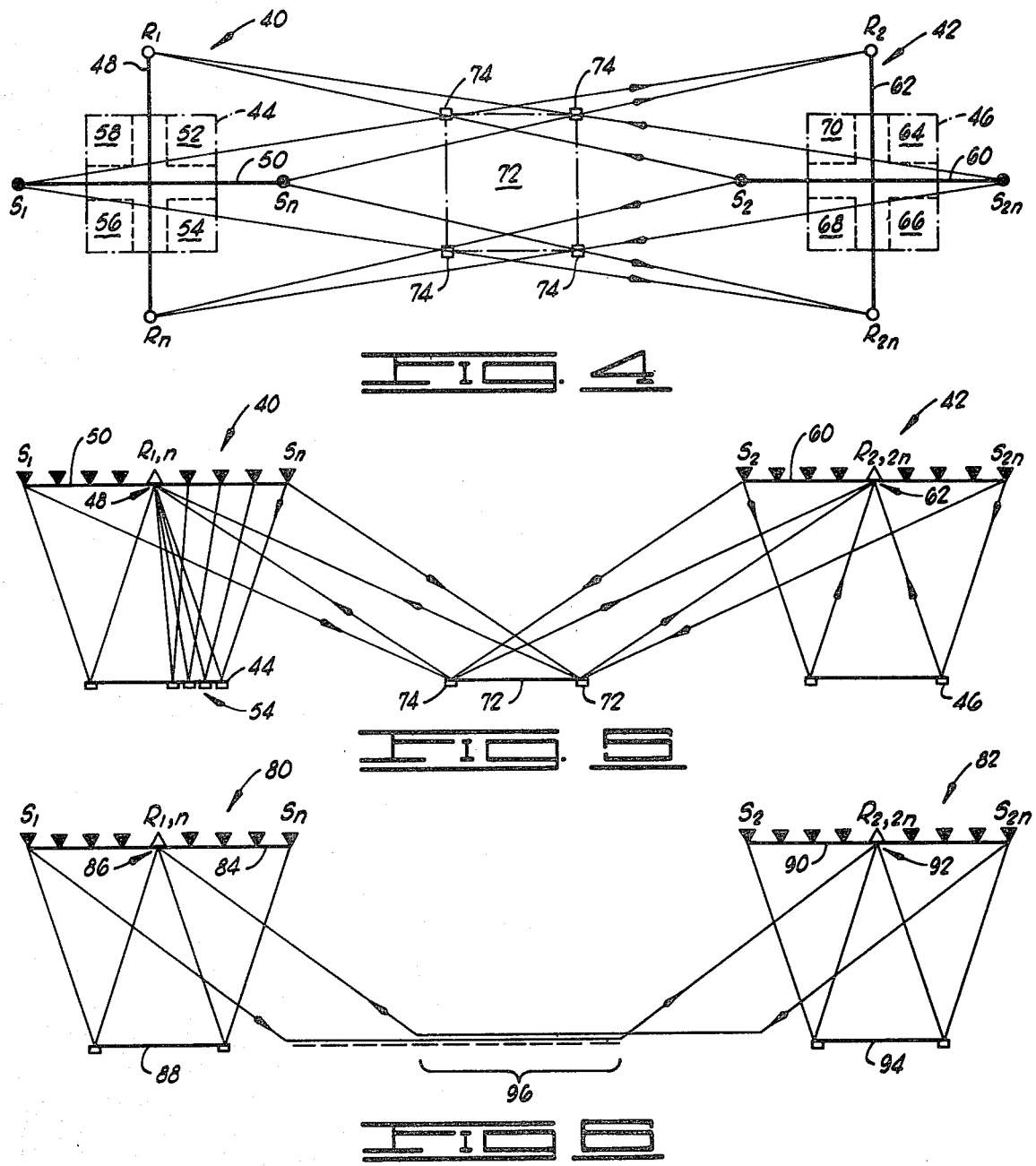

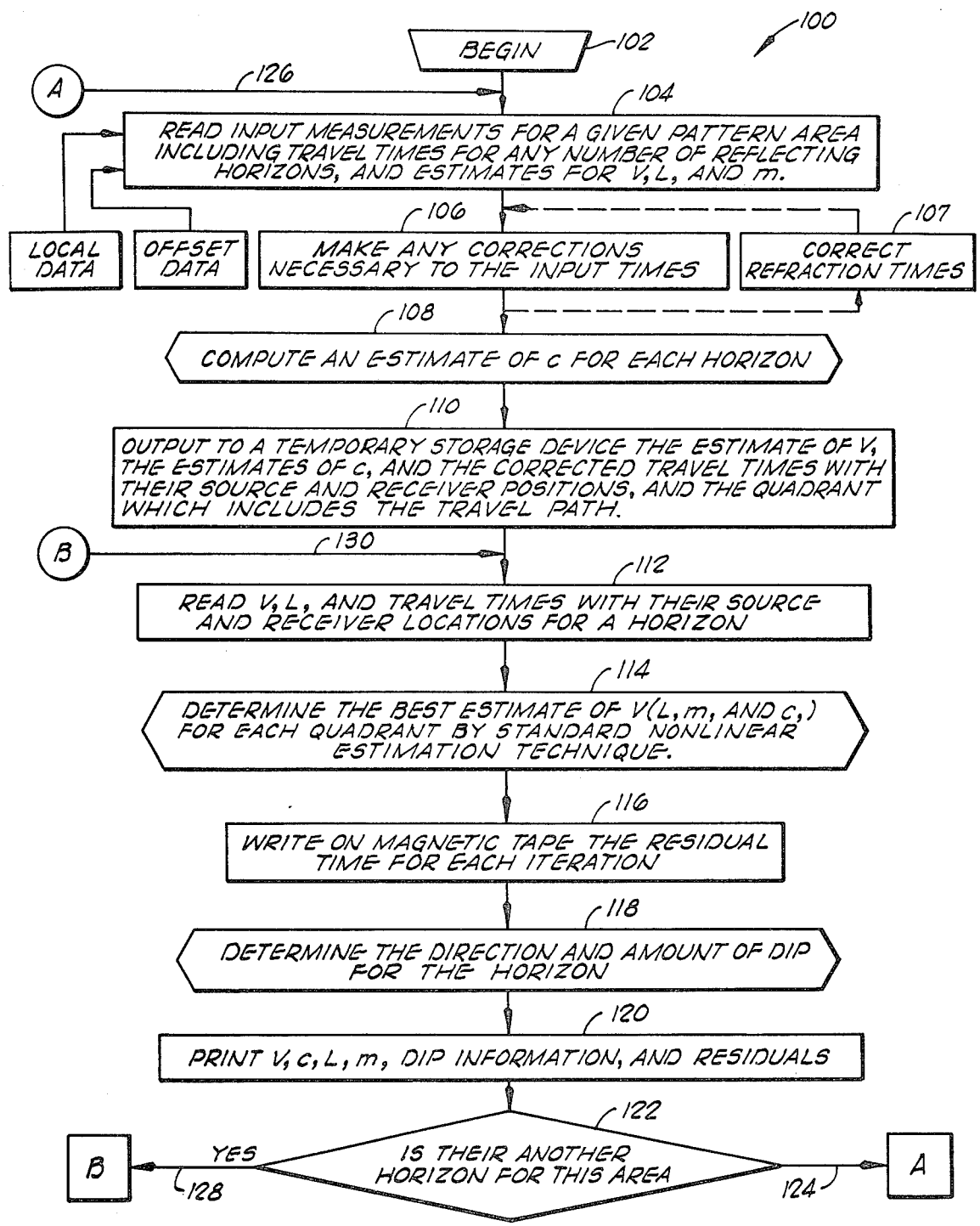

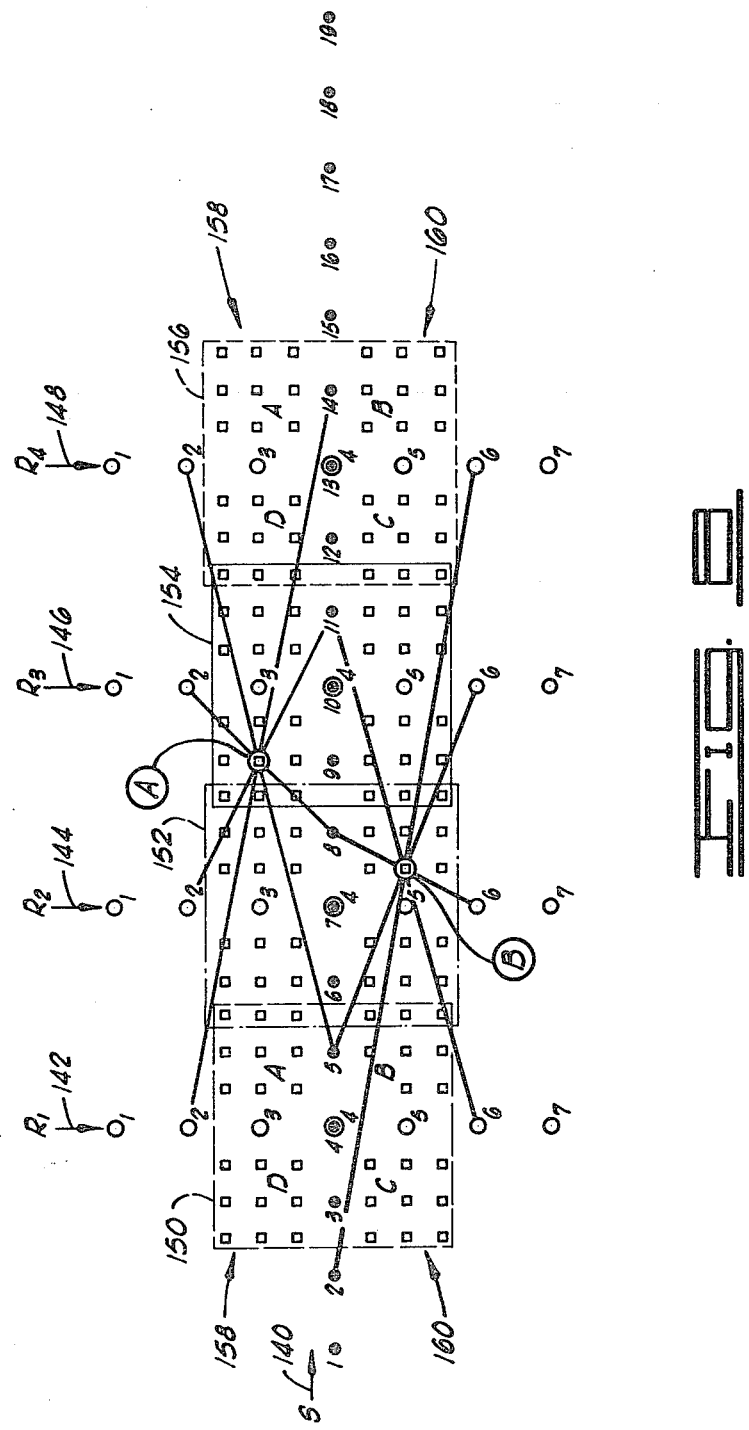

GEOPHYSICAL PROSPECTING METHODS

CROSS-REFERENCE TO RELATED APPLICATION

The present invention a divisional application of Ser. No. 228,864 as filed on Feb. 24, 1972, now abandoned and is related to the subject matter of U.S. patent application Ser. No. 174,744 filed on Aug. 25, 1971 in the name of Waters et al and entitled "Method for Reconnaissance Geophysical Prospecting".

BACKGROUND OF THE INVENTION

1. Field of the Invention

The invention relates generally to geophysical prospecting systems and, more particularly, but not by way of limitation, it relates to an improved seismic prospecting system wherein initial test information can be quickly obtained to provide specified reconnaissance data relative to a given subsurface area.

2. Description of the Prior Art

The prior art includes many and varied teachings related to types and patterns of seismic source-receiver communications, and there are many different types of receiver arrays, source arrays, and groups of such arrays which may be utilized in obtaining seismic information of predetermined content. Most geophysical sounding methods require, for best results, that the system consist of a large plurality of successive soundings compiled for a large number of locations of generally similar symmetry as effected at spaced locations along a predetermined line of survey. It is generally essential to operate along a line of survey in order to compile meaningful data which will then offer proof through continuity of characteristics along the survey line. Recent innovations in shot patterns and data processing techniques have seen evolution of the crossed source-geophone pattern for determination of specific data through use of beam steering principles. Teachings of particular interest relative to seismic information derived through cross patterning are contained in U.S. Pat. Nos. 3,529,282 and 3,597,727; these teachings being directed to analog compilation of signal return derived through successive and continuous cross or oblique patterned beam steered signal compilation, stacking and general reduction of signal-to-noise ratio. The prior art methods are necessarily time consuming and best applied for detailing of a given area rather than for reconnaisance scanning to derive predetermined initial information.

SUMMARY OF THE INVENTION

The present invention contemplates a seismic energy prospecting method wherein two or more crossed source-geophone patterns are utilized to obtain both local and interrelated offset information from respective quadrature arrayed seismic return for further processing thereafter to determine strike, dip, velocity and interactive parameters. In a more limited aspect, the invention consists of the use of a plurality of sounding patterns wherein a plurality of sources and a plurality of receivers or geophones are arranged at each individual pattern in respective lines which are essentially at right angles one to the other; whereupon, repeated shot or vibrational impulse data is processed across diagonal reaches of the individual cross patterns to record data at selected stratum within the respective quadrants of the cross pattern. Data derived for each quadrant of each individual cross pattern is uniformly related with respect to the overall cross pattern and the centerpoint thereof such that the data can be effectively processed relative to selected strata to indicate the desired strike, dip, velocity, etc. (SDV) information. In like manner, data from individual cross patterns is then processed relative to the data derived from selected different cross pattern arrays to derive intermediate or offset information relative to the same selected strata.

Therefore, it is an object of the present invention to provide a reconnaissance method of geophysical prospecting wherein pertinent data can be quickly derived for a large area.

It is also an object of the invention to provide an accurate reconnaissance method which can be effected in a very short time over a large area to provide valuable initial information relative to strike, dip and velocity information, and thus enabling the controlling decisions as to further exploration.

It is yet another object of the invention to provide a seismic sounding method which enables obtaining of more specific data relative to selected strata within the earth.

It is still another object of the present invention to provide a method for obtaining desired data of relatively concentrated nature for a large land area with a minimum of time and crew expense.

It is also an object of the present invention to provide a geophysical prospecting method which enables initial assembly of strike, dip and average or interval velocity data for preselected strata of a large land area without the requirement of continuous sounding information along a survey line.

Finally, it is an object of the present invention to provide a geophysical prospecting method which enables derivation of greater content of seismic signal return relative to the number of times that source-receiver positions must be moved.

Other objects and advantages of the present invention will be evident from the following detailed description when read in conjunction with the accompanying drawings which illustrate the invention.

BRIEF DESCRIPTION OF THE DRAWINGS

FIG. 1 is a plan diagram of a source-receiver arrangement as employed in accordance with SDV reconnaissance as effected by the present invention;

FIG. 2 is a depiction of a three-dimensional model illustrating acoustic energy signal paths as carried out in accordance with the present invention;

FIG. 4 is a schematic diagram in top view of a pair of source-receiver cross pattern arrays as disposed in accordance with the present invention;

FIG. 5 is a schematic view in elevation of the cross pattern array disposition of FIG. 3;

FIG. 6 is a schematic diagram in elevation illustrating spaced cross pattern arrays with refractive seismic energy propagation through the offset information area;

FIG. 7 is a flow diagram of the data processing program as utilized in carrying out the method of the present invention;

FIG. 8 is a top view shown in schematic illustration of a form of reconnaissance survey as effected utilizing a series of cross pattern arrays;

DETAILED DESCRIPTION OF THE INVENTION

Figure 3:
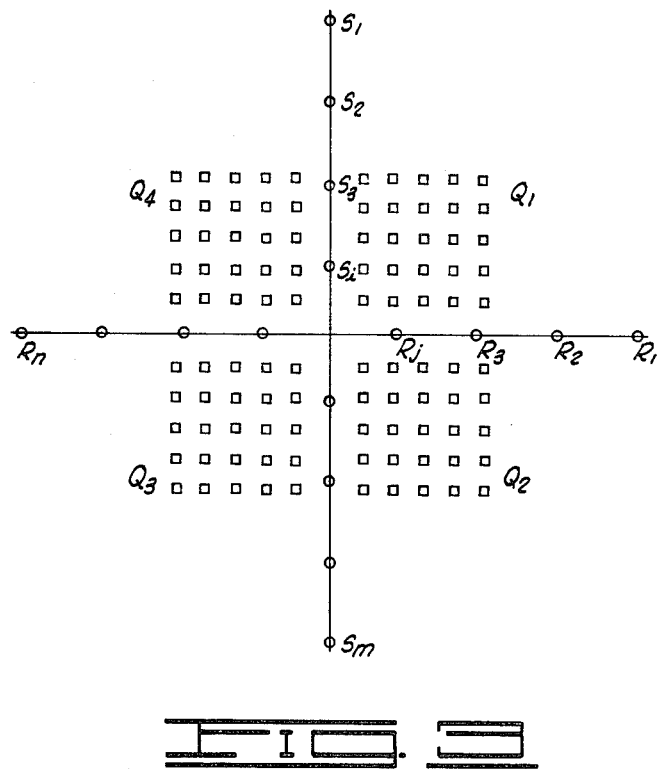
FIG. 3 is a schematic diagram of an SDV quadrantal pattern.

As shown in FIG. 1, an SDV cross pattern 10 consists of surface-disposed sources and receivers as arrayed in a cross pattern. Thus, a plurality of sources 12a through 12n are disposed in a line while a plurality of receivers 14a through 14n are disposed in a line generally perpendicular and essentially bisecting said source line. Each of adjacent sources 12a through 12n are equally-spaced as are receivers 14a through 14n and a center position 16 consists of both a source and receiver. The source-receiver position 16 enables direct depth measurements thereby to afford a depth equating factor to remaining energy paths about the cross pattern 10.

The SDV cross pattern 10 is fully disclosed in the related patent application Ser. No. 174,744, hereinabove cited as a related co-pending application. Selective source energization and reception enables return signal analysis relative to substrata lying beneath the quadrants of cross pattern 10. Thus, energization of sources 12g through 12n with detection of reflected signals at receivers 14a through 14e may be resolved through processing to define a quadrant reflection pattern 18 in quadrant A of the underlying substratum, e.g. a preselected reflecting strata underlying the surface-disposed source-receiver pattern. In like manner, energization of sources 12g through 12n in association with receivers 14g through 14n define quadrant pattern 20, and similar quadrant patterns 22 and 24 are defined by detection of signal return across remaining diagonal extremities of cross pattern 10.

In the particular cross pattern 10 shown by way of example in FIG. 1, the quadrant patterns 18 through 24 each consist of a square of reflection points, four reflection points per side. Thus, all receivers and sources across the lines are not employed. For example, excitation of source 12n propagates energy downward along ray paths 26 to respective ones of the row of relection points 28 with reflection back upward to respective receiver arrays or receivers 14i, 14j, 14k and 14n. In like manner, ray paths emanating from source 12k to the same receivers would derive the row of reflection points 30, and so forth as excitation of sources to the same receivers proceeds inward along the source line. The extent of coverage when utilizing all quadrantal sources and receivers and is illustrated with respect to the quadrant pattern 22 wherein all coordinated ray paths are shown as between sources 12a through 12e and receivers 14g through 14n. Each quadrant pattern will be a generally square configuration, variations being brought about only by the existing dip or other anomalies of the horizontal strata causing pattern 18.

The individual sources and receivers as indicated in FIG. 1 may be either individual operating units or plural units in specific array. Thus, receivers 14a through 14e are shown as consisting of receivers each comprised of a plurality of seisphones in linear array. Likewise, sources may be operated in specific array, for example linear, as shown by sources 12g through 12n. A normal field layout may consist of from 10 to 20 source units and 10 to 20 geophone arrays and, for example, the total distance from end to end may be on the order of 1.5 to 3 miles. It may be noted then that, if the distance from end to end were two miles, the area covered by the reflection points within the respective cross pattern quadrants would approach one square mile at each reflecting horizon. This ratio will, of course, be slightly affected by departures of the reflecting horizons from horizontal.

For the reflecting horizon having no dip, it will be possible to choose an average velocity to that stratum which will so affect the normal moveouts associated with the individual reflection points that it will reduce the attitude of the four rectangular reflection point quadrantal patterns to a single flat plate. If the velocity is not correct, it will give rise to a complex surface of symmetry about two directions at right angles, and the fitting of a least squares plane to the total set of depth points will result in increased variance. As will be further described below, an average velocity may also be chosen for energy from a sloping reflecting layer except that the resulting least squares best plane will be dipping, and its angle of dip and strike may then be determined so that it will cause the variance to be a minimum.

Usage of the cross pattern source-receiver combination per se is fully set forth in the above-identified related application Ser. No. 174,744, and the cross patterns per se only constitute a tool of which many may be employed in carrying out the method of the present invention. Thus, one or more cross patterns are utilized in association with standard seismic field equipment to obtain the measurements of subsurface perimeters relating to strike, dip, velocity, and depth to the reflecting horizon is the specified area of exploration. In addition to localized data for each cross pattern, offset information is obtained at intermediate reflecting points between each selected pair of cross patterns, which offset data is processed relative to localized data to derive a more complete data pattern for the selected horizon. Such data processing may be carried out either by analog equipment or by digital processing systems; however, the programmed digital computation system has proven to be the most efficient manner of processing the data, and such program, similar to that disclosed in U.S. application Ser. No. 174,744, is set forth below.

Input measurements will include travel time from source to reflecting stratum to receiver for at least four independent paths and preferably more for increased reliability of the parameter estimates. The velocity estimate will not assume a flat plane with no dip as is the case with most velocity estimates, and all parameters are allowed to vary simultaneously until the best fit to the travel times is obtained.

With reference to FIG. 2, we assume a constant velocity layer V between the reference plane or surface and the reflecting horizon 32. The quantity c is the perpendicular distance from a selected origin to the reflecting plane. The quantities L and m are direction cosines of the perpendicular relative to the X and Y axis, respectively. Thus, if m is the direction cosine relative to the z axis, then the relation will equate as $$L^2 + m^2 + n^2 = 1 \qquad (1)$$

The equation of the plane is then $$Lx + my + nz = c \qquad (2)$$

Also shown in FIG. 2 are the additional geometric relationships for a ray path denoted as $Q_i$ which extends from the source position $P_j(x_j, y_j, O)$ and the receiver position $P_i(x_i, y_i, O)$. The image point of the ray path or source $P_j$ is the point $I_j$, and the reflection point on the reflecting horizon 32 is $R_{ij}$. Thus, the reflection path from $P_j$ to $R_{ij}$ to $P_i$ is the same as the distance $I_{ij}$ to $P_i$ where I is the image of $P_j$ in the given plane. Then, it will follow that $$D_{ij}^2 = [x_j - x_i(1 - 2L^2) + 2Lmx_i - 2Lc]^2 + \quad (3)$$
$$[y_j - y_i(1 - 2m^2) + 2Lmx_i - 2mc]^2 + [2nc - 2Lnx_i - 2nmy_i]^2$$

where D is equal to the distance from source to reflector to receiver.

Letting K equal $1/V^2$ and $n^2$ equal the quantity $(1 - l^2 - m^2)$, where V equals velocity and T is equal to energy travel time, then the relation holds as $$T_{ij}^2 = K \{[x_j - x_i(1 - 2L^2) + 2Lmy_i - 2Lc]^2 + \quad (4)$$
$$[y_j - y_i(1 - 2m^2) + 2Lmx_i - 2mc]^2 +$$
$$4(1 - L^2 - m^2) [c - Lx_i - my_i]^2\}$$

The parameters L, V, m, and c are then determined for the case where the relationship $$\sum_{ij} (t_{ij} - T_{ij})^2 \quad (5)$$

is a minimum, and $t_{ij}$ are the measured travel times. The reflection times as utilized at this point may be measured through the use of standard seismic equipment.

Since it is necessary to estimate four independent parameters, it is necessary that at least four independent paths to the plane be measured in order to obtain a solution. For added statistical error cancellation, it is recommended that several more paths, on the order of at least ten, also be measured and utilized. By knowing the source and receiver locations, and the measured travel time for all paths, L, m, n, c, and V can be estimated. As these parameters vary nonlinearly, standard nonlinear estimation techniques must be utilized in formulating the estimated values. Thus, it is suggested to use techniques such as those described in "BMD, Biomedical Computer Programs, X-Series Supplement", techniques which utilize step-wise Gauss-Newton iterations, such procedures being well documented in the statistical literature since about 1960.

Utilization of this technique will require that the function (Equation 1), and the partial derivatives of the function with respect to each parameter be defined. Thus, the partial derivatives above mentioned may be defined as follows:

$$\frac{\partial T_{ij}}{\partial V} = \frac{-1}{V^2} \{[x_j - x_i(1 - 2L^2) + 2Lmy_i - 2Lc]^2 + \quad (6)$$
$$[y_j - y_i(1 - 2m^2) + 2Lmx_i - 2mc]^2 +$$
$$4(1 - L^2 - m^2) [c - Lx_i - my_i]^2\}^{\frac{1}{2}}$$

$$\frac{\partial T_{ij}}{\partial L} = \frac{4}{V} \{(x_j - x_i(1 - 2L^2) + 2Lmy_i - 2Lc)(2Lx_i + \quad (7)$$
$$my_i - c) + mx_i(y_j - y_i(1 - 2m^2) + 2Lmx_i - 2mc) -$$
$$2x_i(1 - L^2 - m^2)(c - Lx_i - my_i - 2L(c - Lx_i - my_i)^2\}$$
$$\{2[(x_j - x_i(1 - 2L^2) + 2Lmy_i - 2Lc)^2 + (y_j - y_i(1 - 2m^2) +$$
$$2Lmx_i - 2mc)^2 + 4(1 - L^2 - m^2)(c - Lx_i - my_i)^2]^{\frac{1}{2}}\}^{-1}$$

$$\frac{\partial T_{ij}}{\partial m} = \frac{4}{V} \{Ly_i(x_j - x_i(1 - 2L^2) + 2Lmy_i - 2Lc)(y_j - \quad (8)$$
$$y_i(1 - 2m^2) + 2Lmx_i - 2mc)(2my_i + Lx_i - c) -$$
$$2y_i(1 - L^2 - m^2)(c - Lx_i - my_i) - 2m(c - Lx_i - my_i)^2\}$$
$$\{2(x_j - x_i(1 - 2L^2) + 2Lmy_i - 2Lc)^2 + (y_j - y_i(1 - 2m^2) +$$
$$2Lmx_i - 2mc)^2 + 4(1 - L^2 - m^2)(c - Lx_i - my_i)^2]^{\frac{1}{2}}\}^{-1}$$

$$\frac{\partial T_{ij}}{\partial c} = \frac{-4}{V} \{L(x_j - x_i(1 - 2L^2) + \quad (9)$$
$$2Lmy_i - 2Lc) + m(y_j - y_i(1 - 2m^2) +$$
$$2Lmx_i - 2mc) - 2(1 - L^2 - m^2)(c - Lx_i - my_i)\}$$
$$\{2(x_j - x_i(1 - 2L^2) + 2Lmy_i - 2Lc)^2 + (y_j - y_i(1 - 2m^2) +$$
$$2Lmx_i - 2mc)^2 + 4(1 - L^2 - m^2)(c - Lx_i - my_i)^2]^{\frac{1}{2}}\}^{-1}$$

If the reflecting horizon is significantly different from a plane, the estimates of the direction and amount of dip, as well as the average velocity will be affected. The validity of the planar assumption can be tested by processing the data by halves, i.e., computing independent estimates for $(Q_1, Q_2)$, $(Q_3, Q_4)$, $(Q_1, Q_4)$, $(Q_2, Q_3)$. If these estimates are sufficiently close to the same value, the planar assumption is valid. See FIG. 3.

Due to the high degree of correlation between the dip parameters (L, m) and the velocity parameter for a single quadrant, it is impractical to estimate separate parameters (L, m, V) for each quadrant independently. However, due to the physical characteristics of average velocity, it is reasonable to assume that the average velocity remains essentially constant over the extent of all four quadrants even though the direction and amount of dip changes from one quadrant to the next. If data quality is sufficiently poor, it may be necessary to place bounds on the amount of change which can be tolerated in the azimuth for each of the four quadrants. This constraint can be imposed in the mathematical solution for the parameter estimates.

The following derivations are required for the quadrant analysis. In this solution, estimates of (L, m, c) are obtained for each quadrant, while the velocity estimate is required to be the same for each quadrant.

The equation for the travel time $T_{ij}$ from the source to the reflecting horizon and back to the receiver is given below, where parameters $(L_1, L_2, L_3, L_4)$, $(m_1, m_2, m_3, m_4)$ and $(c_1, c_2, c_3, c_4)$ are the respective direction cosines for each quadrant, and V is the average velocity to the reflecting horizon.

Thus, $$T_{ij} = \frac{1}{V} (S^2 + P^2 + 4UW^2)^{\frac{1}{2}} \quad (10)$$

where $$S = \sum_{k=1}^{4} q_k \{x_j - x_i(1 - 2L^2_k) + 2L_k m_k y_i - 2L_k c_k\}, \quad (11)$$

$$W = \sum_{k=1}^{4} q_k \{1 - L^2_k - m^2_k\}, \quad (12)$$

$$U = \sum_{k=1}^{4} q_k \{c_k - L_k x_i - m_k y_i\}, \text{ and} \quad (13)$$

-continued $$P = \sum_{k=1}^{4} q_k\{y_j - y_i(1 - 2m^2_k) + 2L_k m_k x_i - 2m_k c_k\}. \quad (14)$$

$(x_i, y_i)$ is the coordinate of the ith source, $(x_j, y_j)$ is the coordinate of the jth receiver, and $q_k$ is a binary variable which assumes a value of one when the ith source and jth receiver measure a basement point that falls in the kth quadrant with zero registration for other quadrants.

The nonlinear estimation process requires that partial derivatives of $T_{ij}$ with respect to each parameter be evaluated. The functional relationships for these partial derivatives are:

$$\frac{\partial T_{ij}}{\partial V} = \frac{-1}{V^2}(S^2 + P^2 + 4UW^2)^{\frac{1}{2}} \quad (15)$$

$$\frac{\partial T_{ij}}{\partial L} = \frac{1}{V}(S^2 + P^2 + 4UW^2)^{-\frac{1}{2}} \quad (16)$$

$$\left(S\frac{\partial S}{\partial L} + P\frac{\partial P}{\partial L} + 2W^2\frac{\partial U}{\partial L} + 4UW\frac{\partial W}{\partial L}\right)$$

with expressions similar to (16) for the then partial derivations with respect to m and c obtained by replacing L by the appropriate symbol.

The values of $\partial S/\partial L$, $\partial S/\partial m$ and $\partial S/\partial c$ can then be easily derived from expressions (11), (12), (13) and (14).

FIGS. 4 and 5 illustrate the essential method of the present invention wherein a pair of spaced cross patterns 40 and 42 are utilized to obtain localized data relative to a selected substratum as shown by the respective localized data patterns 44 and 46. Thus, selective source activation and reception, as between receiver line 48 and source line 50, will enable local data collection and establishment of reflection points within each of quadrants 52, 54, 56 and 58, a localized pattern relative to cross pattern 40. In like manner, selective excitation along source line 60 and receiver line 64 of cross pattern 42 will derive the local data defining reflection points within localized quadrant patterns 64, 66, 68 and 70.

An offset data pattern 72 at some point approximately intermediate the position of cross patterns 40 and 42 may then be established by selective excitation of sources of one cross pattern in conjunction with receivers of the other cross pattern. Thus, acoustic energy emanating from sources $S_1$-$S_n$ of source line 50 may be received across receivers $R_2$-$R_{2n}$ of cross pattern 42 to establish a plurality of ordered reflection points within offset data pattern 72. For purposes of illustration, corner reflection points 74 of offset data pattern 72 are shown; however, it should be understood that source energy as received at all receivers $R_2$ through $R_{2n}$ will define reflection points in essentially equal quadrature distribution, according to dip and anomalies of the selected strata, over the whole area of offset data pattern 72. Redundancy and reinforcement of this offset data pattern 72 may then be achieved by processing of the energy travelling in the reverse direction. That is, acoustic energy emanating from sources $S_2$-$S_{2n}$ of cross pattern 42 for reflection within offset data pattern 72 to the respective ones of receivers $R_1$-$R_n$ of cross pattern 40.

As can be seen from FIG. 5, a great multiplication of useful data is enabled by the employ of such as spaced cross patterns 40 and 42 with the further advantage that the additional long offset data pattern 72 is gained without necessity for moving the source-receiver positions within cross patterns 40 and 42. By way of example, the cross pattern widths, i.e. length of source line and crossed receiver line, may be on the order of two miles with a pre-set number of equally spaced sources and receivers contained therein; and if two such cross patterns are disposed eight miles apart, the offset data pattern may also be gained for the substrata position halfway between the two cross patterns or approximately centered at the four mile designation.

The exact distances as well as exact and symmetrical relationships of individual quadrantal reflection point patterns within the local and offset data patterns will depend upon the variances as to depth, dip and velocity characteristics of the horizontal stratum under examination. In any event, it becomes readily apparent that a reconnaissance survey can be run along a survey line extending a considerable distance with but few selectively chosen and spaced cross pattern arrays. The same data as derived for the line of survey may be further reinforced by selective disposition of cross patterns at either oblique or essentially perpendicular spacing from the line of survey to further coordinate pattern data from a selected substratum over a desired breadth of terrain adjacent to or disposed on either side of the line of survey.

In the event that the distance between cross patterns 40 and 42 is too long, or if subsurface anomalies dictate, the long offset information or data pattern may be derived through well-known refractive techniques. Thus, as shown in FIG. 6, a pair of spaced cross patterns 80 and 82 are disposed on the surface of the earth to span a selected subterrain. Cross pattern 80 consists of source line 84 and a receiver line 86 and can be operated in a local mode to derive localized quadrantal pattern information from a local data pattern 88 as reflected from a selected substrata therebelow. Derivation of this data is essentially the same as that carried with respect to the method of FIGS. 4 and 5. In like manner, a remotely disposed cross pattern 82 includes a source line 90 and receiver line 92 which serve to derive localized information for the same event or horizontal substrata causing local data reflection point pattern 94.

Refractive sounding techniques may then be utilized to establish the offset information data in intermediate subterranean area 96. Thus, energy from sources $S_1$-$S_n$ of cross pattern 80 propagate to the selected substrata for refractive movement therealong and detection at receivers $R_2$-$R_{2n}$ of cross pattern 82. Redundant data may be compiled by propagation of acoustic energy from sources $S_2$-$S_{2n}$ of cross pattern 82 to the refracting horizon for return to the receiver line comprising receivers $R_1$-$R_n$ of cross pattern 80. The refractive energy return is then processed in well-known manner to derive the necessary event information which will enable establishment of an offset data pattern in the substrata area 96. If it is assured that at least one vibrator position (or preferably more) is also a receiver position, then the depth of the refractor strata at both source and receiver positions may be calculated using the least squares procedure called the TIME TERM METHOD. FIG. 1 illustrates such as the cross pattern 10 having center position 16 which includes both a source and receiver for direct depth sounding purposes.

While some analog equipmentation may be utilized in systems carrying out the present invention, digital data processing provides the most accurate and facile way of determining the requisite strike, dip, velocity information from the derived event parameter. A flow diagram outlining the program which may be utilized for control of such digital data processing equipment is illustrated in FIG. 7. Thus, referring to FIG. 7, a program 100 begins at input stage 102 which functions with a processing stage 104 to read the input measurements for a given local or offset area, which input measurements include travel times for any number of reflecting horizons, and estimates for the values of V, L and n. These values can be made available utilizing any of various well-known analog or analog/digital seismic signal processing equipment. Further, depending upon the phase of the method operation, the input measurements will be governed by the particular data pattern being processed, i.e. whether it is a local data information pattern or an offset data information pattern as derived between two separate cross patterns.

The output from processing stage 104 is then applied to a processing stage 106 which functions to make corrections to the input times. Processing stage 106 will make any corrections which may be necessary to the input travel times, i.e. source and receiver elevation corrections, re-insertion of $\Delta T$ elimination of time associated with a designated source or receiver position, etc. In the case of processing of refractive signal return, output from processing 106 is recycled through a stage 107 which serves to correct refraction times in one of the various well-known procedures, e.g. the TIME TERM METHOD.

The time corrected data from processing stage 106 is then applied to a pre-defined process stage 108 which serves to compute an initial estimate of c for each horizon or reflecting stratum. Thus, this amounts to computation of an estimate of perpendicular depth to the stratum selected for investigation. The output from pre-defined process stage 108 is then applied to a processing stage 110 which serves to select and store certain information relating to the processing. Processing stage 110 provides data output to temporary storage devices, which data represent an estimate of the velocity V, an estimate of the perpendicular depth c, as well as the corrected energy travel time and their related source and receiver positions. Output data from processing stage 110 proceeds through a processing stage 112 wherein data selection relative to a specific reflecting horizon is made. Stage 112 serves to read initial estimate values for the velocity V, the L value, and the respective travel times with their source and receiver locations for a specific reflecting horizon.

Information flow from processing stage 112 then proceeds to a pre-defined process stage 114 which serves to determine the best estimate of V, L, m and c values, this stage carrying out the standard nonlinear estimation technique. The pre-defined processing stage 114 may utilize such as the step-wise Gauss-Newton iterations, and these techniques use the function (Equation 1) as well as the partial derivatives (Equations 6 through 9) of the function with respect to each of V, c, L and, for the respective local and offset information data patterns. An iterative solution must be utilized in order to obtain a least squares solution due to the fact that the parameters V, L, m and c are nonlinearly related.

Output from pre-defined process stage 114 then proceeds to a processing stage 116 wherein the residual time data for each iteration is written on magnetic tape. That is, the difference between the input time and the time obtained by evaluating the function (Equation 1) for an iteration. The residual times for all source-receiver paths may be optionally saved. These times may be used subsequently to provide an estimate of weathering or to test the assumption of a planar reflector. Output from processing stage 116 then proceeds to a pre-defined process stage 118 which effects determination of the direction and amount of dip for the selected reflecting horizon or stratum. This stage utilizes the final estimates of V, c, L and m to make such determinations, and this information is then output to stage 120 to provide an output record. The stage 120 provides print out of data for V, c, L, m, and dip information, as well as for residual values. The output stage 120 is also processed through a decision stage 122 to ascertain as to the completion of the processing as decision stage 122 tests for additional horizons related to the selected area. If there exist no more horizons to be processed, negative output via line 124 to the auxiliary operation stage A will serve to terminate the data processing function as this information is recycled to input connector A and lead 126 for signification to the input of processing stage 104. Alternatively, if another horizon does exist for the area, affirmative data output via lead 128 to auxiliary operation stage B will provide indication via connector B and lead 130 for restart of data processing at the processing stage 112. Thus, processing stage 112 will read next additional values of V, L, travel times, and receiver locations for the new data.

FIG. 8 illustrates another form of field array utilizing a plurality of cross pattern arrays to establish strike, dip, velocity information over a wide area while having the capability of achieving several fold redundancy as well as Common Depth Point (CDP) recording and stacking. The array of FIG. 8 consists of one continuous line of sources of source nests 140 which include equispaced sources $S_1$ and $S_{19}$. The source line 140 is then crossed generally perpendicularly by geophone nests within receiver lines 142, 144, 146 and 148 as disposed in equi-spaced relationship along source line 140. The length of source line 140 as well as the number and spacing of individual sources is a matter of choice, selection being dictated by availability of equipment and the exigencies of the particular applications. Similarly, the number and spacing of receivers or geophone nests would be equally alterable in accordance with requirements. In the particular illustration, it may be assumed by way of example that the individual receivers and sources are one-third mile apart such that this particular array would span a survey line length of six miles and a width, e.g. at more central points, of two miles. These dimensions can obviously be expanded or contracted as required.

Each individual source-receiver cross pattern will basically define its own basement reflection point pattern. The cross pattern consisting of receiver line 142 and sources 1 through 7 will have a localized reflection point pattern 150 disposed immediately therebelow. In like manner, SDV cross patterns including each of receiver lines 144, 146 and 148 will coact with respective ones of the adjacent sources to define the localized reflection point cross patterns 152, 154 and 156. Information derived as such would merely constitute a progression of localized cross pattern data along a selected line of survey; however, the method extends the capability of achieving data redundancy and selective Common Depth Point stacking through integral evaluation of seismic signal return from all cross pattern arrays, i.e. a redundant integration of localized and offset reflection points along the line of survey.

The method of stacking is shown by the illustrative ray paths of FIG. 8. Thus, a reflection point A within localized reflection point pattern 154 is established and embellished not only by signal return from the local cross pattern but also by offset reflection (or refraction) data derived from the source-receiver combinations $S_{14}-R_{1,2}$; $S_{11}-R_{2,2}$; $S_8-R_{3,2}$; and $S_5-R_{4,2}$. As another example, a reflection point B lying within still another localized cross pattern 152 is established by data derived from $S_{11}-R_{1,6}$; $S_8-R_{2,6}$; $S_5-R_{3,6}$; and $S_2-R_{4,6}$.

Such stacking of reflection point signal return is effected several fold with respect to all reflection points lying along the line of survey. In addition, terrain permitting, acceptable redundancy and stacking can be achieved without the necessity for overlapping the localized reflection point patterns and by stretching out the individual cross pattern arrays. It may also occur that the method so carried out would utilize refractive signal return in establishing the offset cross pattern information. In suitable country, the reconnaissance sounding method can be carried out in very short time as compared to present surveying methods and approaches to the problem. It should be understood, too, that sources and receivers in the entire layout are obviously interchangeable if one mode of operation is more convenient than the other.

After derivation and storage of the reflection data for the various reflection points contained within a survey area, e.g. such as that shown in FIG. 8 and made up of continuous reflection point patterns 150, 152, 154 and 156, further processing can be carried out to output Common Depth Point (CDP) data or visual record for selected lines along the line of survey. That is, data can be printed out to show Common Depth Point information along the reflection point line indicated by arrows 158, and it may be extended as long as the survey progresses. The CDP information can be established for any desired line of reflection points along the survey line; for example, it may be desirable for comparison purposes to also establish a CDP record for the reflection point line 160 or any other reflection point line extending parallel thereto. The CDP information may also be output for any selected transverse or diagonal reflection point line wherein it may be deemed useful as a tool in further defining the strata under inspection.

Figure 9A:
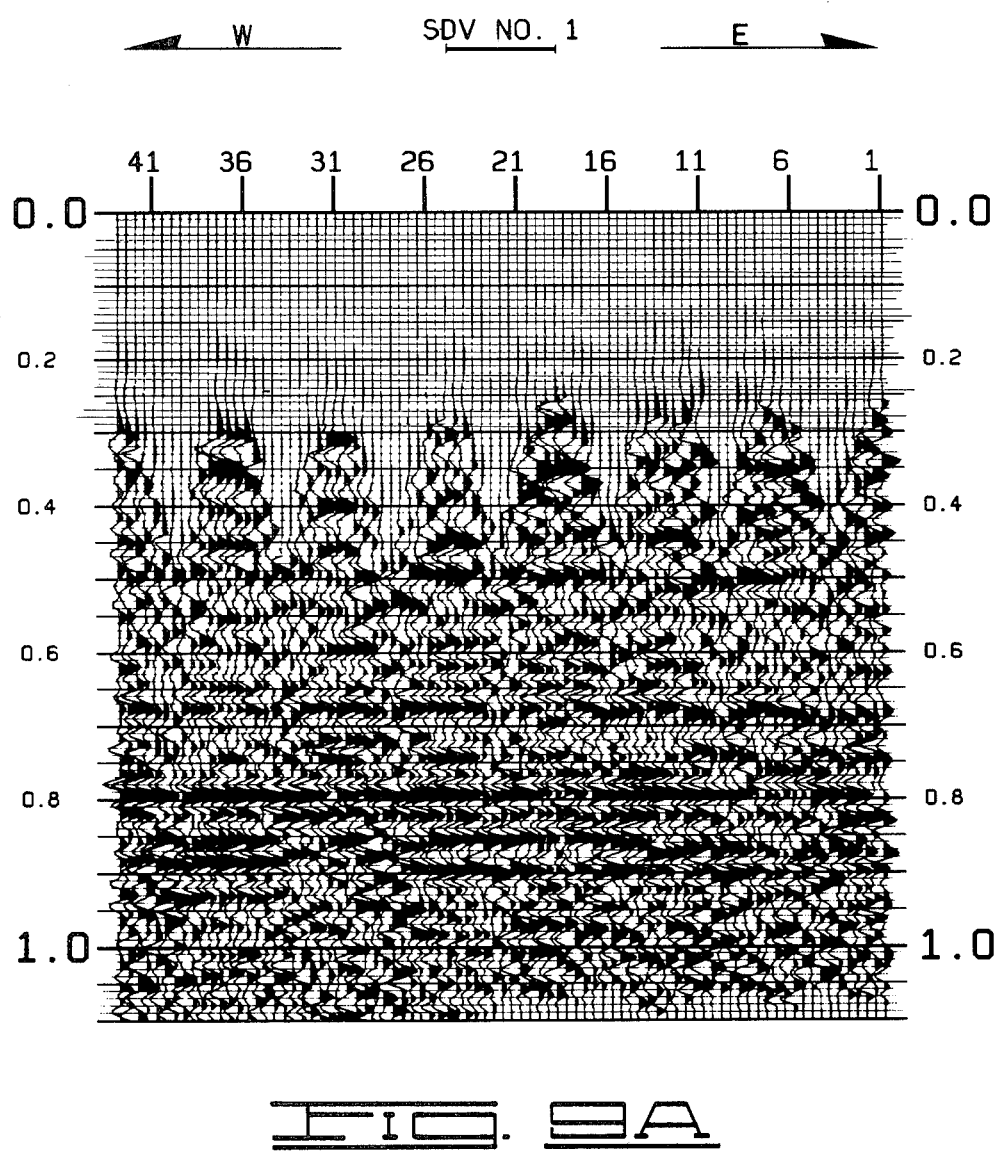
FIGS. 9A, 9B and 9C are reproductions of actual field cross-section data depicting linear SDV data as compiled for adjacent rows of reflection points along a line of survey; and, FIG. 10 is a schematic representation of a reflection point swath showing various processing patterns.
Figure 9B:
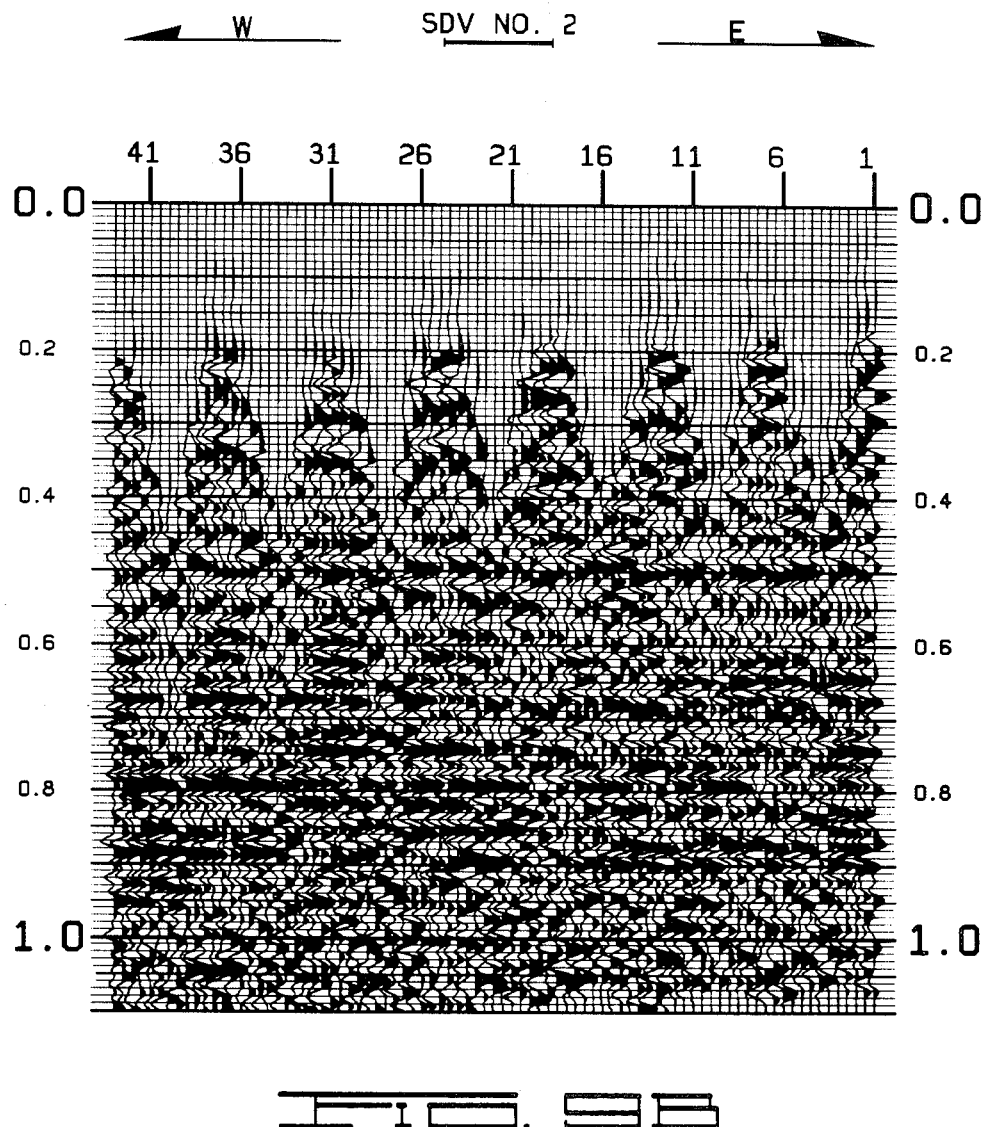
Figure 9C:
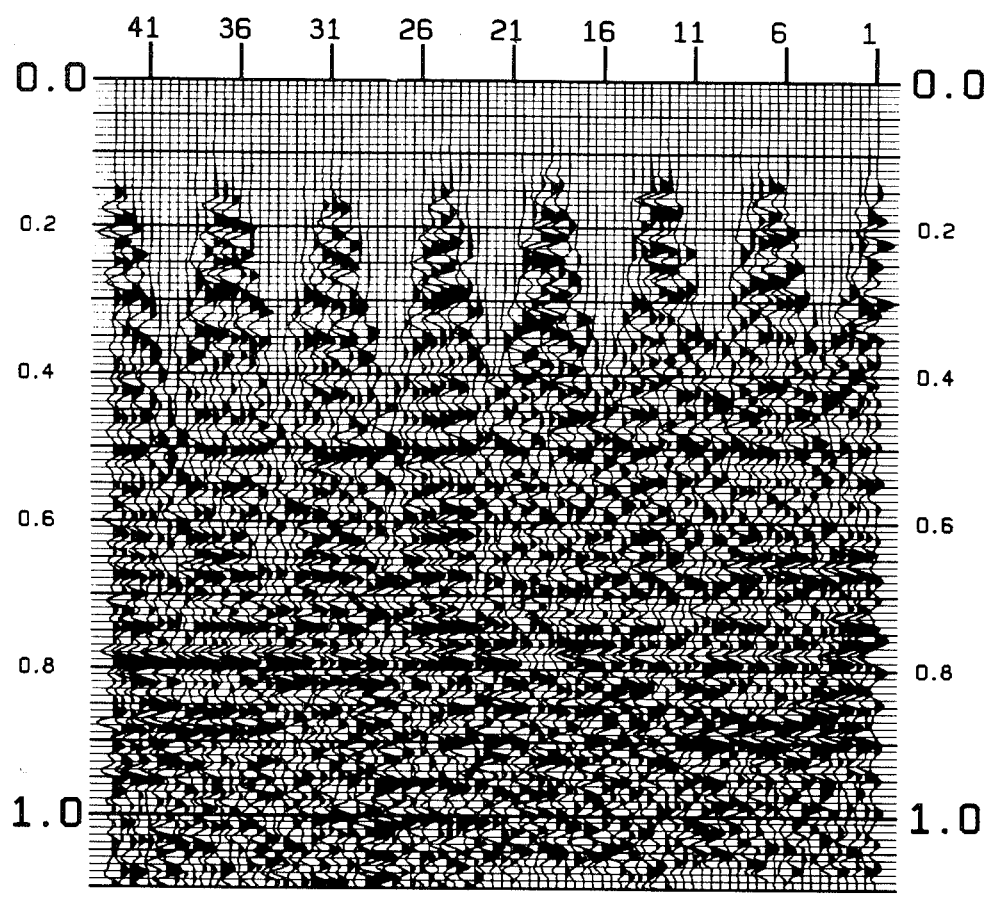

FIGS. 9A, 9B and 9C represent reproduction of actual field data as taken along a line of survey to establish a linear or two-dimensional data representation along the extent thereof. Thus, for example, the data of FIGS. 9A, 9B and 9C would be taken along parallel, equi-distance separated survey reflection point lines such as, for example, lines as indicated by reflection point lines 160, 162 and 164 (FIG. 7). As many such adjacent two-dimensional data lines can be obtained as are required for the particular survey and, in some cases, a great many of such two-dimensional data representations may be recorded for input to computer processing equipment to derive particular forms of sub-strata contour depictions, selected parameter outputting, and so forth.

Figure 10:
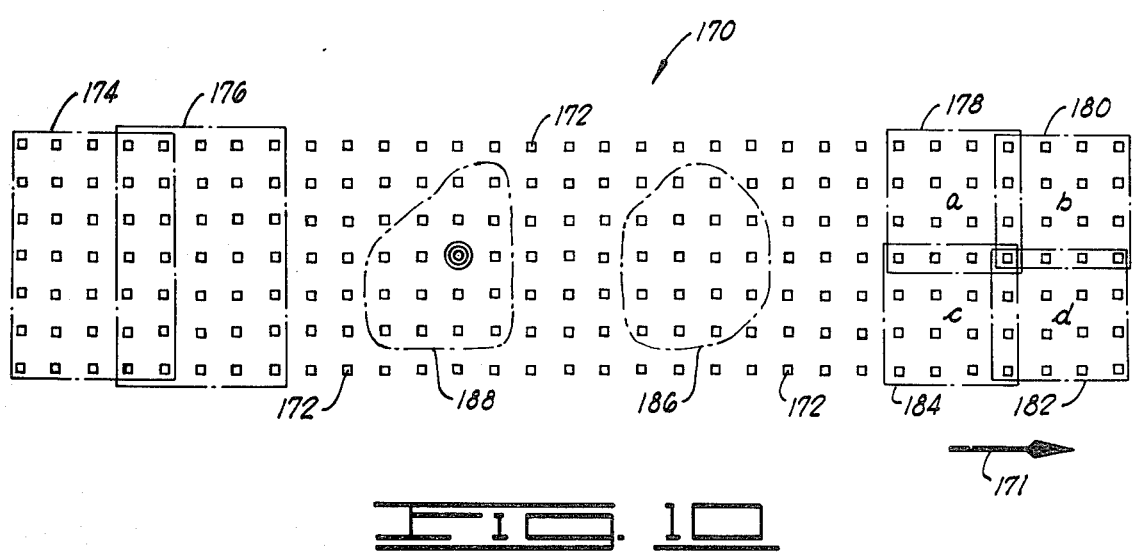

After establishment of a subsurface pattern of reflection points, the data process is not restricted to evaluation of data in alignment with or directly transverse to the line of survey. FIG. 10 illustrates an expanse or swath of reflection points 170 as may be established along a survey line 171. The reflection point swath 170 is made up of a large plurality of individual reflection points 172, which relfection points 172 may be established by any number of surface-disposed SDV cross patterns operating in conjunction to define both local and offset reflection point patterns. Thus, a shifting SDV cross pattern may be utilized to establish local reflection point data at subsurface points within boundaries 174 and 176, and the progressive movement of SDV cross patterns may be carried along until such as reflection point swath 170 is fulfilled. The distance of incremental movement will, of course, be directly dependent upon the size or number of sources and receivers in the individual SDV cross patterns employed.

Reflection point construction may also be carried out by establishing a plurality of juxtaposed reflection point patterns through optimal disposition of the surface SDV cross patterns, such as the reflection point sub groups shown in boundaries 178, 180, 182 and 184. Thus, sufficient tying data common to two or more of the sub group patterns may be utilized in establishing the strike, dip and velocity data within that overall group. In addition to the directly reflected or local data, offset information as derived from a sub group of offset reflection points is readily available for evaluation relative to data from one or more selected local patterns.

It should be understood that the reflection point groups 174 through 184 of FIG. 10 are necessarily directly related to one or an integral combination of SDV cross patterns, as the boundaries may be established for selected sub groups of such reflective points. Sub group selection may also be effected in adherence to other reflection point patterns such as the generally circular pattern of boundary 186 or the non-symmetrical pattern of boundary 188. For example, data selection may be made to establish reflection points 172 within non-symmetrical boundary 188, whether derived from offset or local information, and whether derived from in-line or obliquely aligned SDV cross patterns; and the data may be processed to determine strike, dip and velocity within that particular sub group of reflection points 172. In nearly all cases the reflection points 172 will be redundantly determined, with all of them being so determined in the overlapping SDV cross pattern case as illustrated by boundary 174 and boundary 176 and additional patterns incrementally established along line of survey 171. Establishment of redundancy requires that the separate times of arrival of received energy must be evaluated relative to the appropriate offset distance in each case.

The foregoing discloses a method utilizing plural SDV cross pattern source-receiver arrays wherein strike azimuth, dip and velocities can be established for one or more selected strata underlying the field of operation, the procedure being enabled through utilization of nonlinear estimation technique and reliance upon the fact that smooth changes of velocity will nearly always be experienced progressing from one cross pattern set up to the next. Upon smoothing of velocity values, dip and strike can be readily recalculated for any selected points within the SDV pattern coverage along a line of survey. Establishment of the SDV data will then allow further refinement and processing to output such as isochron maps of one or more selected strata to better distinguish such as fault traces, meander patterns, structural axes and the like, these determinations being enabled independent of weathering corrections in the area traversed.

A geophysical survey carried out in accordance with the present invention will enable utilization of a modified constant offset weathering determination since weathering corrections may not be repeated for the same depth points. Such corrections can be compared and adjusted from residual maps made at each horizon from SDV determinations. Further, upon establishment of Common Depth Point data along a line of survey, the CDP data may be individually processed and will yield its own velocity information which is then available for further determinations as to strike, dip and related parameters.

Use of the present prospecting method makes possible the choice of any sub group from the reflection point swath of reflection points along with the determination of reflection point(sub stratum)attitude and energy velocity. It also enables the construction of lines of cross-section, all points of which are redundantly determined, so that a multiplicity of such cross-section lines are parallel to the line of survey and will represent the geology in planes which are essentially parallel but displaced perpendicularly to each other by relatively small distances. Establishment of such linear two-dimensional data enables the tracing of common geological features from one to the next and renders visible the change of character of such a feature from each cross-section to the next. The present method is operational to derive strike, dip and velocity information of continuous nature without the necessity for utilizing beam steering principles.

The method has extreme versatility in that it may be utilized for reconnaissance survey or concentrated data establishment for any of various selected substrata beneath the field of survey. In addition, a maximum of data can be acquired while necessitating a minimum of equipment movement, i.e., repeated measured re-location of surface vibrators, seisphone nests, and the like. The inherent flexibilities of digital data processing also allow for variations in SDV cross pattern alignments, i.e., variations from perpendicular or particular selected angles of array, and this feature becomes particularly important in rock or lake country and thickly wooded terrain.

Changes may be made in the combination and arrangement of steps as heretofore set forth in the specification and shown in the drawings; it being understood that changes may be made in the embodiments disclosed without departing from the spirit and scope of the invention as defined in the following claims.

What is claimed is:

1. A method of seismic projecting comprising the steps of positioning seismic energy shot points and seismic energy receiving pickups in continuing cross patterns at or near the surface whereby said shot points are distributed linearly on an axis parallel to the prospecting direction and regularly spaced from one another and said pickups are distributed on a plurality of spaced lines perpendicular to said axis, and on each line, said pickups are distributed regularly at an interval equal to a selected integral number of shot point spacings, relating said shot points and pickups to a two-dimensional grid of seismic energy reflector points located on a sub-surface reflection stratum in the form of a quadrature array of reflector points disposed around each individual intersection of a shot point distribution axis with one of said perpendicular pickup lines such that each of said reflector points in each quadrature array will give rise to a plurality of elementary energy paths through a shot point, said reflector point and a pickup point, emitting seismic energy from each shot point and receiving reflected energy at each pickup, and mixing the plurality of energy signals to form a common depth point stack for each said reflector point in each quadrature array.

2. The method of seismic prospecting of claim 1, wherein said grid of reflector points is a net whose mesh is a parallelogram.

3. The method of seismic prospecting of claim 2, wherein said parallelogram is a rectangle.

4. A method of seismic prospecting of claim 1, wherein said pickup lines are progressively offset from one line to the next by a spacing equal to at least one half the length of the perpendicular pickup lines.

* * * * *